United States Patent [19]

O'Brien

[11] 4,259,055

[45] Mar. 31, 1981

[54] COATING APPARATUS

[75] Inventor: William G. O'Brien, Towanda, Pa.

[73] Assignee: E. I. Du Pont de Nemours and Company, Wilmington, Del.

[21] Appl. No.: 80,457

[22] Filed: Oct. 1, 1979

[51] Int. Cl.[3] .............................................. B29F 3/04

[52] U.S. Cl. ................................ 425/376 A; 118/600; 425/224; 425/467

[58] Field of Search ............... 425/376 R, 376 A, 467, 425/461; 264/212, 216; 118/600

[56] References Cited

U.S. PATENT DOCUMENTS

| | | | |
|---|---|---|---|
| 2,364,435 | 12/1944 | Foster et al. | 264/216 |
| 2,551,582 | 5/1951 | Carlson . | |
| 2,681,294 | 6/1954 | Beguin | 264/212 |
| 2,901,770 | 9/1959 | Beck . | |
| 2,973,827 | 3/1961 | Eggman . | |
| 3,085,289 | 4/1963 | Van Riper | 425/376 R |
| 3,292,577 | 12/1966 | Cressey, Jr. et al. | 118/600 |
| 3,500,610 | 3/1970 | Chenoweth et al. . | |
| 3,568,640 | 3/1971 | Kuettner | 425/376 R |
| 3,584,120 | 6/1971 | Chenoweth et al. . | |
| 3,695,221 | 10/1972 | Schaeuble . | |
| 3,858,642 | 1/1975 | Battiston et al. | 264/212 |
| 3,915,606 | 10/1975 | Straub et al. | 425/376 R |
| 4,061,031 | 12/1977 | Grimsrud . | |
| 4,091,129 | 5/1978 | Schaeuble . | |
| 4,115,085 | 9/1978 | Barbe . | |

*Primary Examiner*—Jeffery R. Thurlow

[57] ABSTRACT

A sectional, coating die having a shaped shim between two die plates. The shim defines an extrusion slot and has an integral tab that extends laterally into a cavity in one of the plates for diverting bubbles and foam in the coating formulation.

4 Claims, 4 Drawing Figures

COATING APPARATUS

TECHNICAL FIELD

This invention relates to the application of coatings to webs and, more particularly, to the diecoating of photographic films.

BACKGROUND

Coating has been accomplished by either extruding or cascading a fluid formulation onto an advancing film. Both modes are disclosed in U.S. Pat. No. 2,681,294 to Beguin. In some instances, for example, where the coating formulation has a low viscosity and must be stirred to keep particulate ingredients dispersed, the extrusion of bubbles and foam has led to streaks that make the film unacceptable.

DISCLOSURE OF INVENTION

Streaks traceable to foam and bubbles have been virtually eliminated with an extruder that includes mating die plates and a unique shim located between the plates to define an extrusion slot. According to this invention, an integral flap or tab is bent laterally from the shim and projects into a cavity in one of the die plates. The coating formulation enters the cavity on one side of the tab and flows under and around it to the extrusion slot.

DESCRIPTION OF APPARATUS

Figure 1:
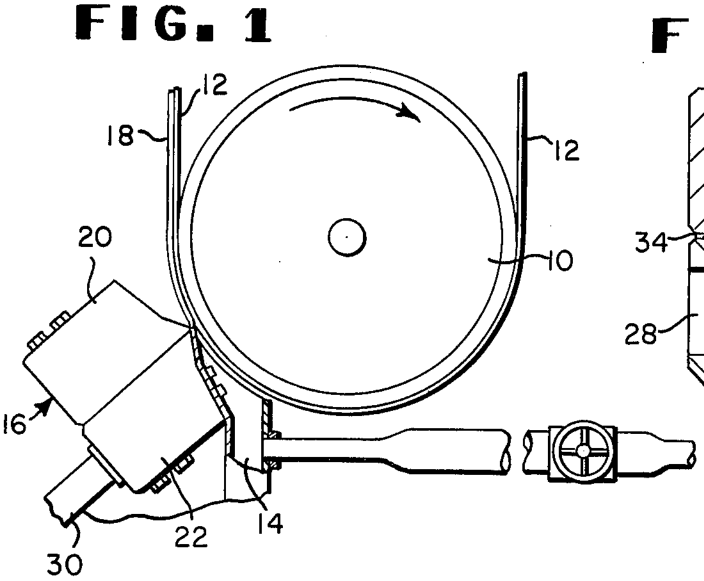
FIG. 1 is a side view of a coating apparatus that includes the extruder of this invention.

As shown in FIG. 1, the coating apparatus includes a driven roll 10 on which a strip of film 12 is carried past a vacuum box 14 and an extruder 16. The extruder applies a coating 18 to one side of film 12.

Extruder 16 has upper and lower, mating, die plates 20,22. In a use embodiment, plates 20,22 were fabricated from stainless steel. The plates have sloped front faces with wedge-shaped tips 24,26 to facilitate location of the extruder at an angle, closely adjacent roll 10, and yet leave clearance for film 12 and coating 18. Plate 22 has a passage 28 adapted for connection to a pipe 30 through which a coating formulation is pumped to an elongated cavity 32.

Figure 2:
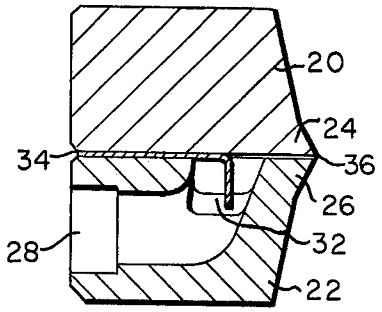
FIG. 2 is a transverse, sectional view of the extruder.
Figure 3:
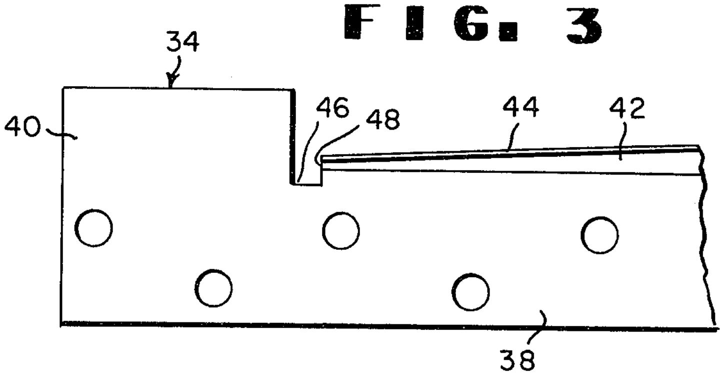
FIG. 3 is a fragmentary, bottom view of the shim shown in FIG. 2.
Figure 4:
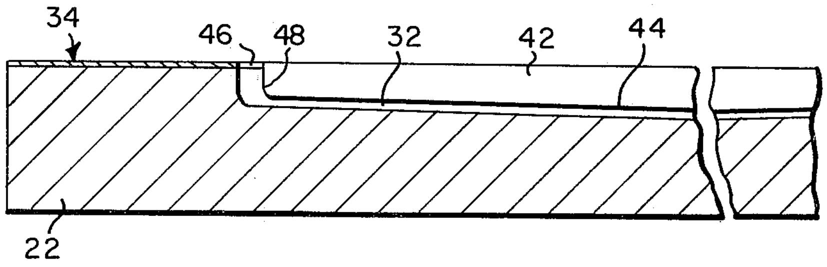
FIG. 4 is a fragmentary, longitudinal, sectional view of the lower die plate.

Referring to FIGS. 2 and 4, cavity 32 is sloped to a maximum depth at its midpoint. It is at the midpoint that passage 28 joins the cavity.

Plates 20,22 are spaced by a shim 34 that is shaped to present an extrusion slot 36 in communication with cavity 32. In a use embodiment, the shim 34 was cut and formed from four mil brass stock. It is, in effect, an apertured strip 38 with end extensions 40 and a laterally bent, central, flap or tab 42. Flap 42 has a tapered, outer edge 44 that is spaced uniformly from and conforms in shape to the bottom of cavity 32. Between each extension 40 and the tab 42, strip 38 is notched, as shown at 46. Flap 42 has end edges 48, each aligned with an edge of the notch 46. The extruder is held in assembly by fasteners that pass through plates 20,22 and the apertures in the rear strip 38 of shim 34.

In operation, film 12 is advanced past vacuum box 14 and extruder 16. A suitable, fluid, coating formulation is pumped into cavity 32 through pipe 30 and passage 28. Most of the coating material passes under flap 42 to extrusion slot 36. Buoyant forces cause bubbles and foam to rise and be caught by flap 42. Under the influences of hydrodynamic forces involved in the flow to and through the cavity 32, the trapped bubbles work their way out to the notches 46 and then flow to slot 36. In this manner, coating disturbances due to bubbles and foam are limited to narrow borders of the coating and those borders can either be trimmed or left outside of the image area.

The extruder 16 has particular utility in the application of an overcoat on an undercoat of a photopolymer which, in turn, is on a subbed, polyester, film base. Observation through an experimental, upper die plate fabricated from a transparent plastic and other experimentation have shown that the deaerating die shim disclosed herein is effective in keeping buoyant bubbles and foam from catching in the die slot and causing streaks in an area of film 12 having a width corresponding to the width of flap 42. It has also been used in the undercoating die and should prove useful in connection with other coating formulations of low viscosity.

Instead of providing notches 46, flap 42 could terminate at extensions 40 and a port for drawing off bubbles and foam could be drilled through top plate 20 and register with an aperture in strip 38 over cavity 32. Other modifications of a similar nature will occur to those skilled in the art without departing from the invention which, accordingly, is intended to be limited only by the scope of the accommmpanying claims.

What is claimed as new and desired to be secured by Letters Patent is:

1. An extruder including mating die plates and a shim located between the plates to define an extrusion slot, one of said plates having a cavity opening into said slot, the improvement comprising provision of an integral flap bent laterally from the shim and extending into the cavity.

2. The extruder of claim 1 wherein said cavity has an elongated bottom wall and said flap has an outer edge spaced therefrom.

3. The extruder of claim 2 wherein said bottom wall slopes from its ends to a maximum depth at its mid-point and the outer edge of said flap conforms in shape to said bottom wall.

4. The extruder of claim 1 wherein said cavity is elongated with bottom and end walls and wherein said flap has edges spaced from said bottom and end walls.

* * * * *